United States Patent
Bekker et al.

(10) Patent No.: US 12,447,898 B2
(45) Date of Patent: Oct. 21, 2025

(54) DRIVING COMPONENT FOR AN ADJUSTING INSTRUMENT

(71) Applicant: MCi (Mirror Controls International) Netherlands B.V., Woerden (NL)

(72) Inventors: Anne Catharina Martha Bekker, Alphen aan den Rijn (NL); Bastiaan Bartjan Maat, Groot-Ammers (NL); Tom Adriaan Jansen, Utrecht (NL); Alex Lorier, Zoetermeer (NL); Paulus Gerardus Maria Van Stiphout, Woerden (NL); Paul Michael Wolber, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 654 days.

(21) Appl. No.: 17/762,633

(22) PCT Filed: Sep. 23, 2020

(86) PCT No.: PCT/NL2020/050586
§ 371 (c)(1),
(2) Date: Mar. 22, 2022

(87) PCT Pub. No.: WO2021/060979
PCT Pub. Date: Apr. 1, 2021

(65) Prior Publication Data
US 2022/0348140 A1    Nov. 3, 2022

(30) Foreign Application Priority Data
Sep. 23, 2019   (NL) .................................... 2023881

(51) Int. Cl.
B60R 1/074    (2006.01)
B60R 1/072    (2006.01)
B60R 1/076    (2006.01)

(52) U.S. Cl.
CPC .............. B60R 1/072 (2013.01); B60R 1/074 (2013.01); B60R 1/076 (2013.01)

(58) Field of Classification Search
CPC .......... B60R 1/072; B60R 1/074; B60R 1/076
(Continued)

(56) References Cited

U.S. PATENT DOCUMENTS 6,022,113 A * 2/2000 Stolpe ..................... B60R 1/074
                                                        359/872
6,130,514 A * 10/2000 Oesterholt .............. B60R 1/074
                                                        359/872
(Continued)

FOREIGN PATENT DOCUMENTS

CN       204821345 U     12/2015
JP       2013075618 A     4/2013
(Continued)

*Primary Examiner* — Ricky D Shafer
(74) *Attorney, Agent, or Firm* — Volpe Koenig

(57) ABSTRACT

A drive component comprising a first rotation part and a second rotation part arranged to rotate together around a common central axis with respect to each other around that central axis. The drive component further comprises a rotation limiter operative between the two rotation parts, which limits rotation between them.

The rotation limiter is so arranged that when the first rotation part is driven to rotation, the first rotation part after traversing a free angular stroke carries the second rotation part in a mutual angular position determined by the rotation limiter, i.e. the carry-along angle, along in rotation. The rotation limiter comprises an indexer energized by rotation of the first and/or second rotation part, so that in successive driving cycles on the drive component the carry-along angle is indexed and the rotation parts in successive driving cycles differ in mutual angular position at carry-along.

18 Claims, 6 Drawing Sheets

(58) Field of Classification Search
USPC .......................................... 359/841, 873, 877
See application file for complete search history.

(56) References Cited

U.S. PATENT DOCUMENTS

| | | | |
|---|---|---|---|
| 6,390,630 B1* | 5/2002 | Ochs ..................... | B60R 1/074 |
| | | | 248/478 |
| 10,730,437 B2* | 8/2020 | Wan ...................... | B60R 1/07 |
| 2005/0000058 A1* | 1/2005 | Kleissen ................ | B60R 1/074 |
| | | | 16/235 |
| 2007/0029179 A1* | 2/2007 | Brouwer ................ | B60R 1/074 |
| | | | 200/329 |
| 2007/0035862 A1* | 2/2007 | Brouwer ................ | B60R 1/074 |
| | | | 359/841 |
| 2007/0084707 A1* | 4/2007 | van den Brink ....... | B60R 1/074 |
| | | | 359/877 |
| 2013/0321941 A1* | 12/2013 | van Stiphout .......... | B60R 1/074 |
| | | | 359/877 |
| 2018/0345862 A1 | 12/2018 | Van Stiphout | |
| 2018/0345863 A1* | 12/2018 | Bouaziz ................ | G02B 7/182 |
| 2020/0339037 A1* | 10/2020 | Lievaart ................ | B60R 1/074 |
| 2021/0046874 A1* | 2/2021 | Harris .................... | B60R 1/074 |
| 2021/0070222 A1* | 3/2021 | Harris .................... | B60R 1/076 |

FOREIGN PATENT DOCUMENTS

| | | | |
|---|---|---|---|
| WO | 2017074193 A1 | 5/2017 | |
| WO | 2017095224 A1 | 6/2017 | |
| WO | 2019182442 A1 | 9/2019 | |

\* cited by examiner

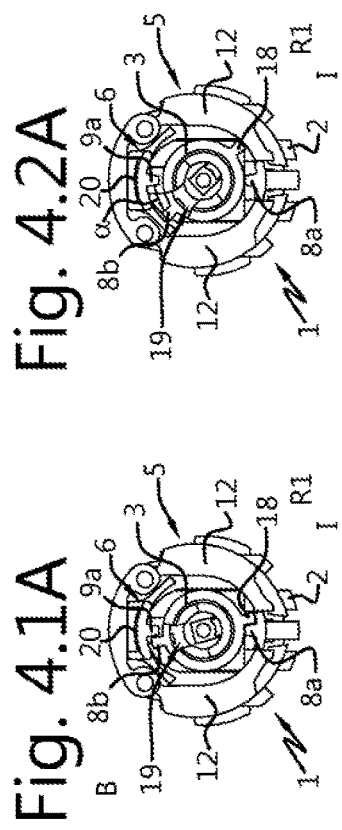
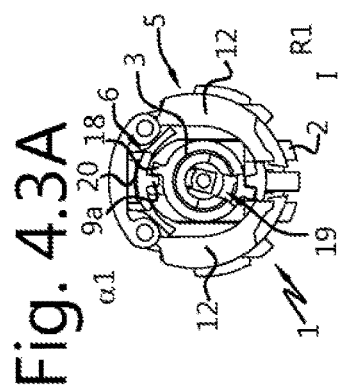
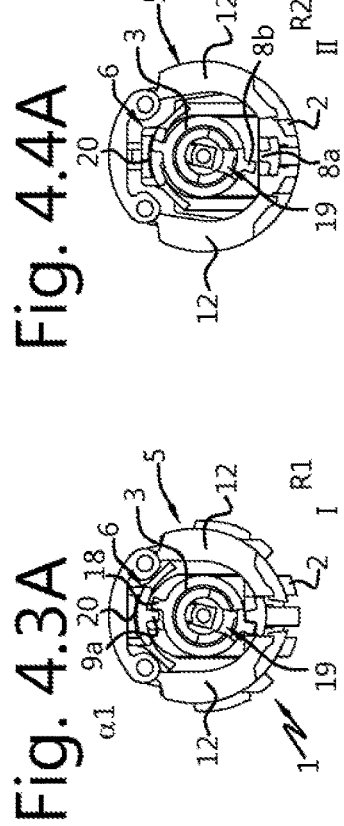
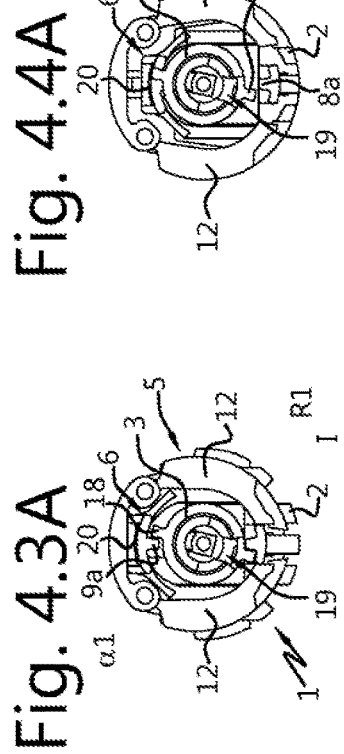
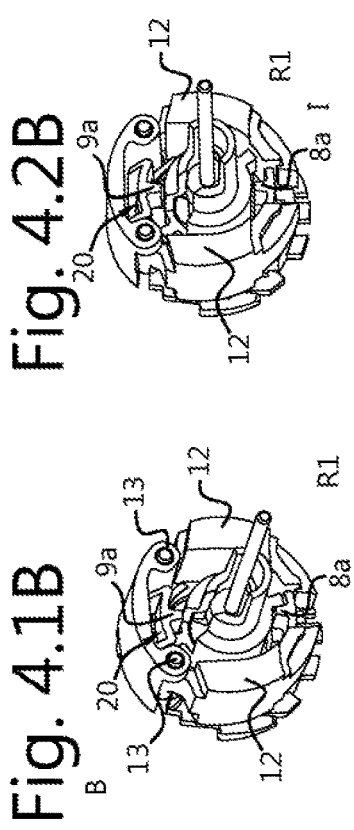
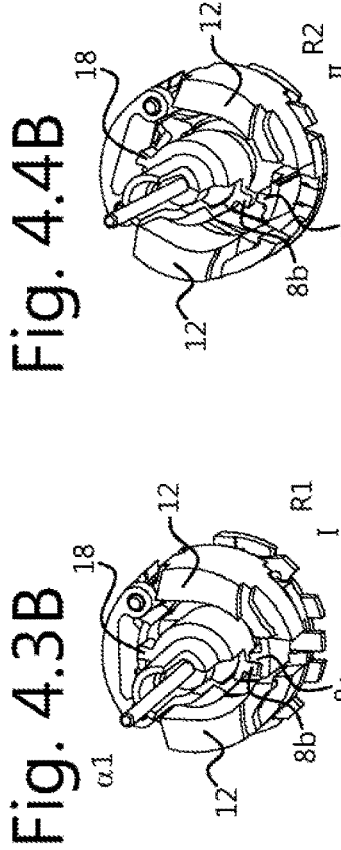
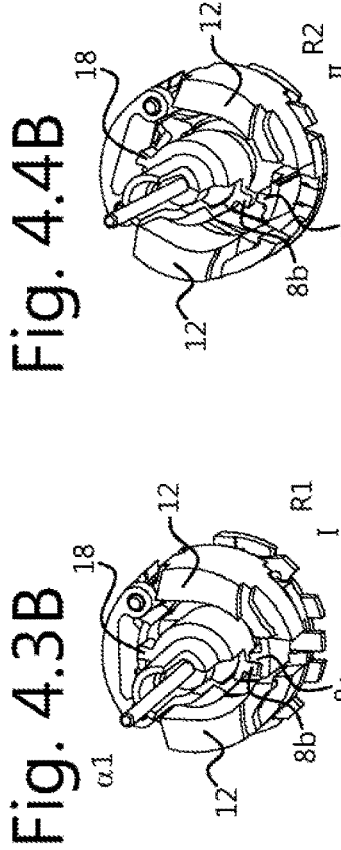
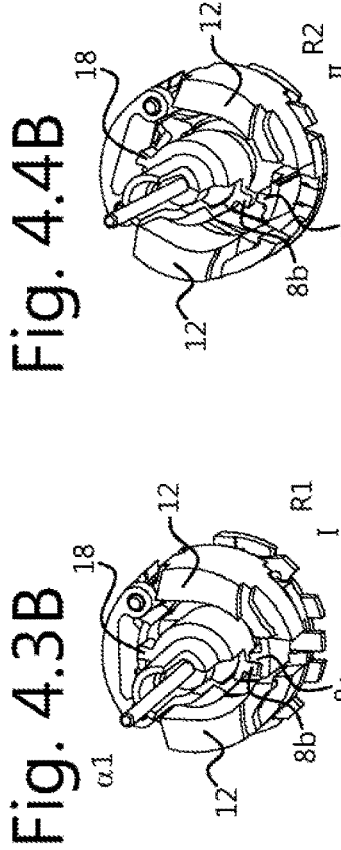
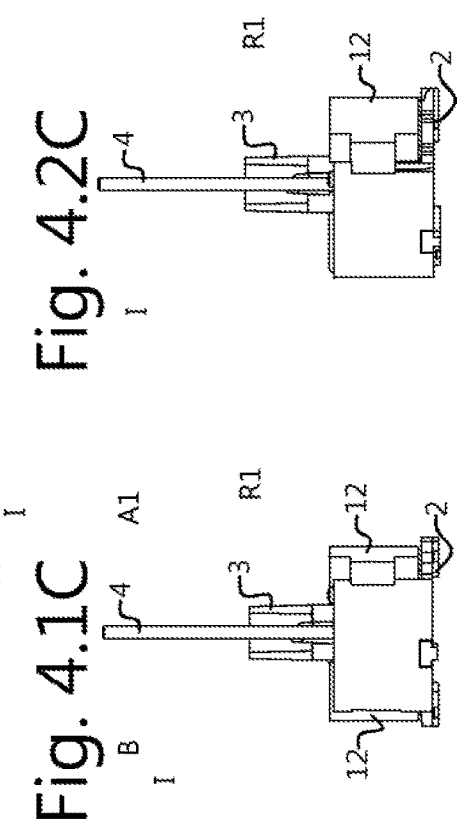
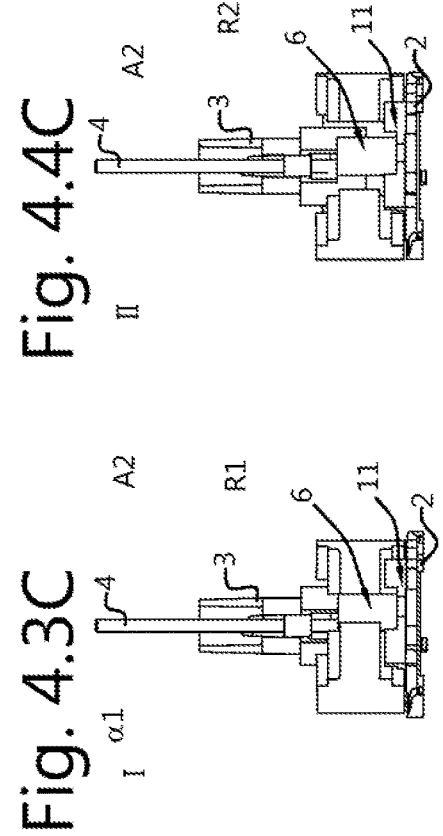
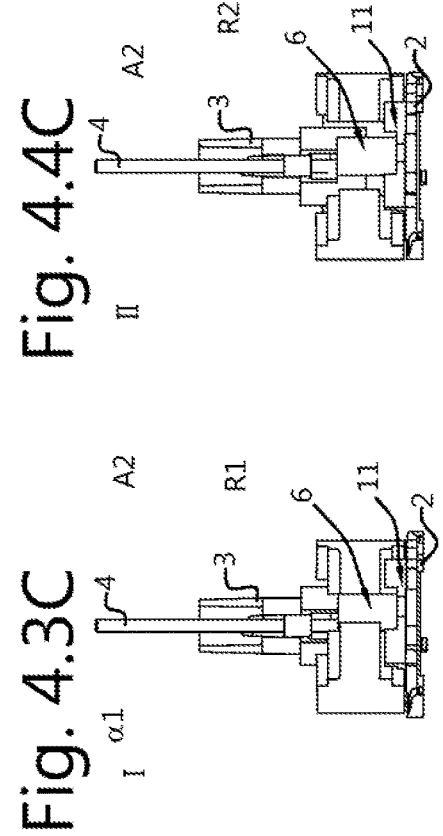
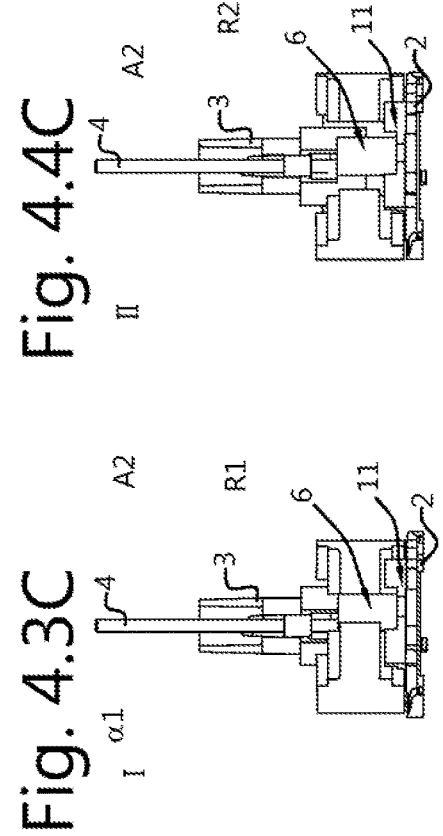

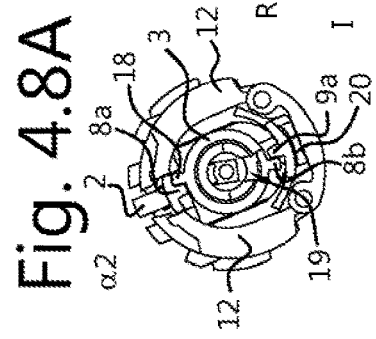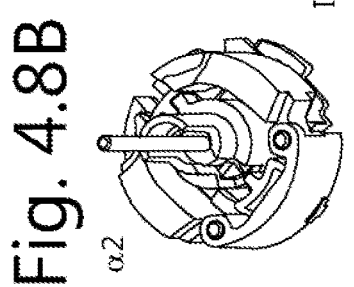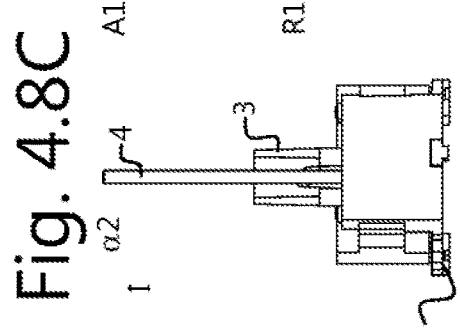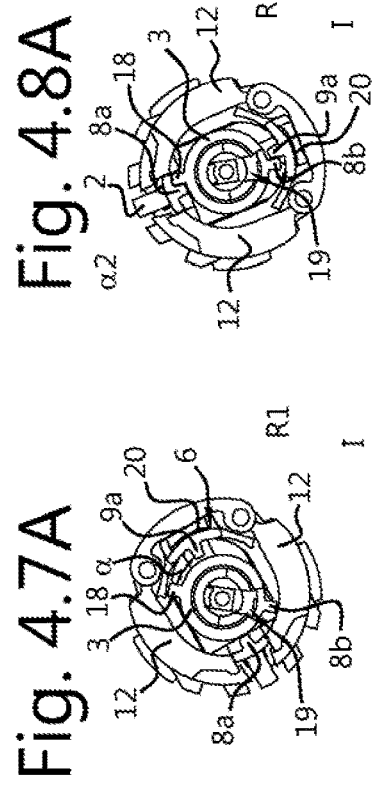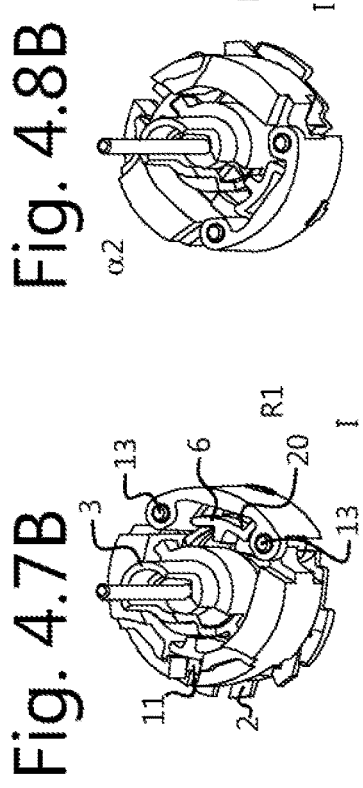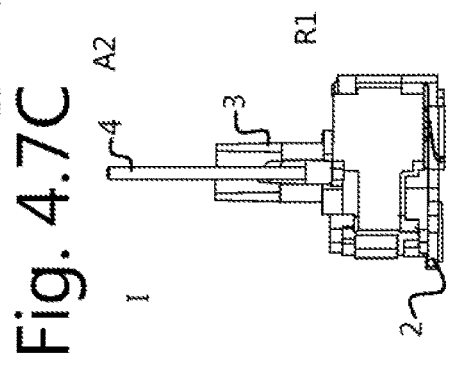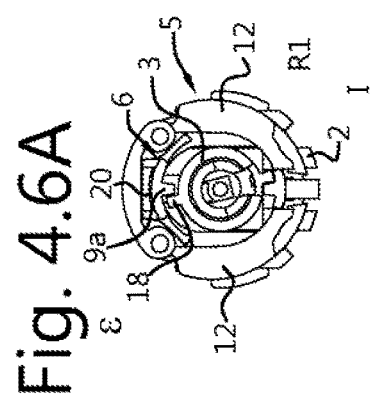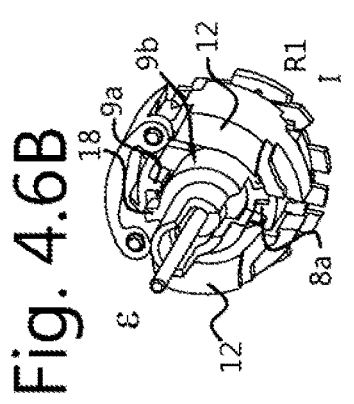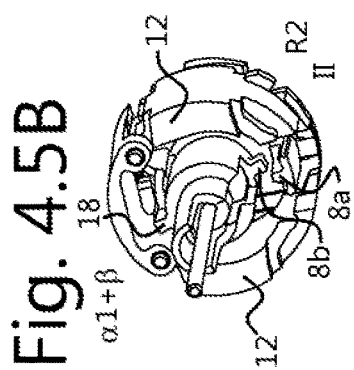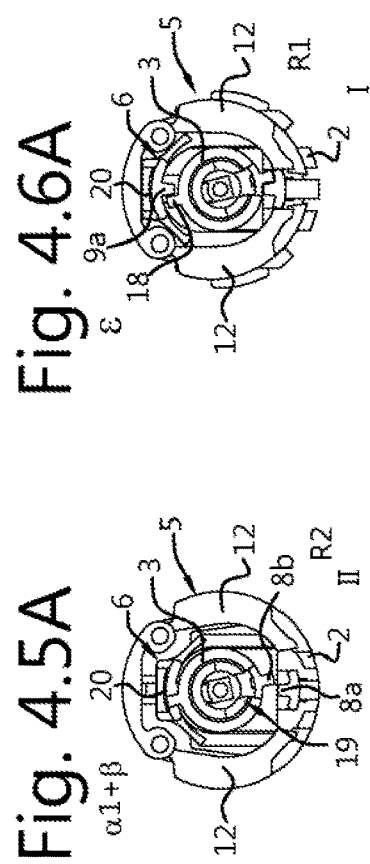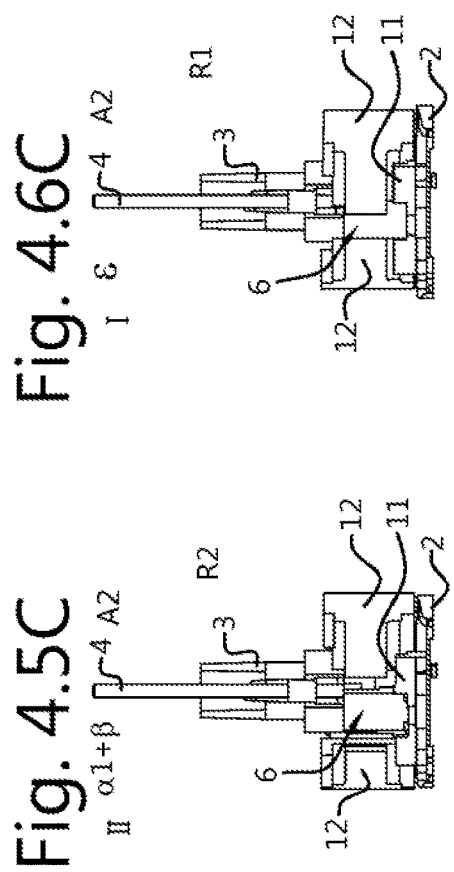

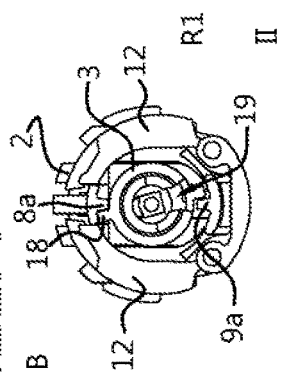
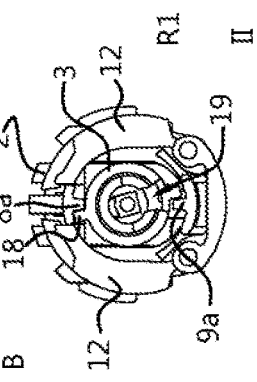
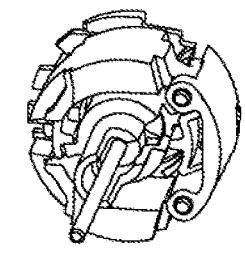
Fig. 4.9A  Fig. 4.10A  Fig. 4.11A
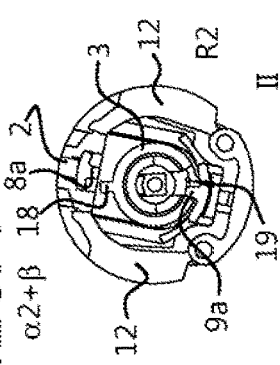
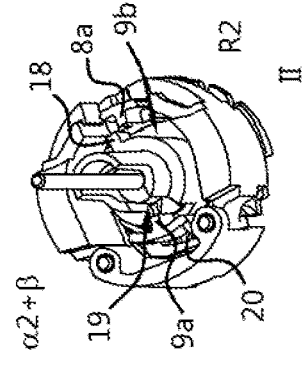
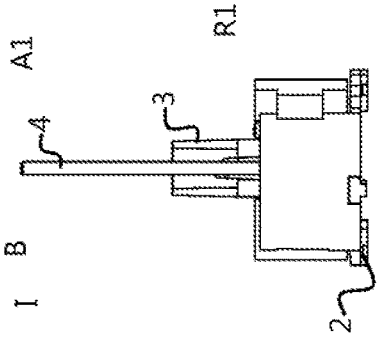
Fig. 4.9B  Fig. 4.10B  Fig. 4.11B
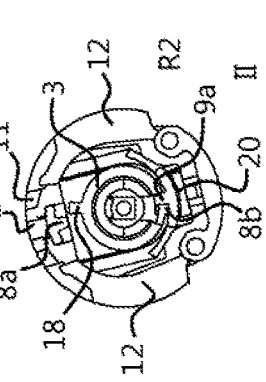
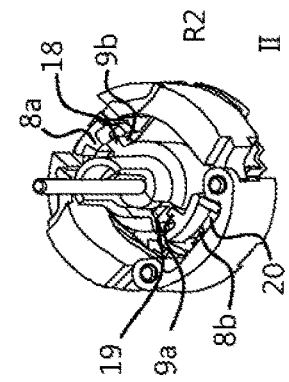
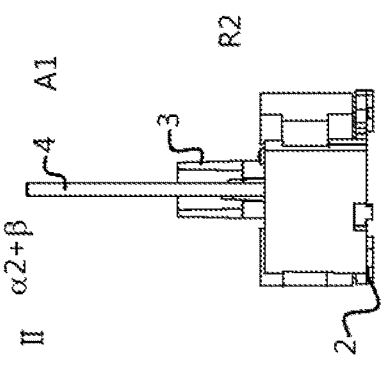
Fig. 4.9C  Fig. 4.10C  Fig. 4.11C
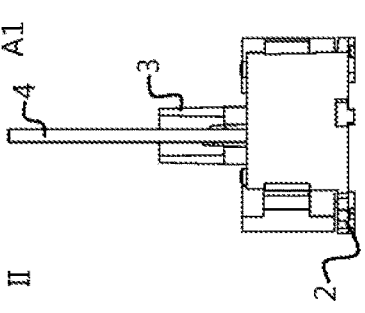

DRIVING COMPONENT FOR AN ADJUSTING INSTRUMENT

CROSS REFERENCE TO RELATED APPLICATIONS

This application is a 35 USC § 371 National Stage application of International Patent Application No. PCT/NL2020/050586, which was filed on Sep. 23, 2020, entitled "DRIVING COMPONENT FOR AN ADJUSTING INSTRUMENT" which claims priority to Netherlands Patent Application No. 2023881, filed Sep. 23, 2019 and is incorporated herein by reference as if fully set forth.

The invention relates to a drive component, for example for an adjusting instrument for adjusting an exterior vision unit of a motor vehicle.

An adjusting instrument for an exterior vision element of a motor vehicle usually comprises a carrier which carries an exterior vision unit, such as an exterior mirror, camera, LIDAR and/or display. The carrier can then be part of the housing of the exterior vision unit, or form a separate part thereof. The carrier is usually adjustable via a drive, in particular an electrical drive, with respect to an adjusting instrument base to be mounted on the motor vehicle, and is then adjustable or not with respect to the housing of the exterior vision unit.

The adjusting instrument is often intended to adjust the vision unit about multiple adjustment axes, in particular both about an axis of standing orientation with respect to the fixed world and about an axis of lying orientation with respect to the fixed world. For example, when the exterior vision unit is in a drive position, the angle at which a driver can look via the exterior vision element can be set. Adjustment about the standing axis can then usually be done in two directions, i.e., both from left to right and from right to left. Adjustment about the lying axis can then usually be done likewise in two directions, i.e., both from bottom to top and from top to bottom. In practice, often the term mirror glass actuator is used. The adjusting instrument then usually comprises two housing parts which are pivotably connected with each other, namely a fixation part for coupling with a carrying frame, and an adjusting part for coupling with the exterior vision unit. Typically, an output part is connected with the fixation part via two separate drives each with its own electric motor, so that the adjusting movement of the output part carrying the exterior vision unit can be carried out in a driven manner per adjustment axis.

Also, the adjusting instrument may be intended to adjust the vision unit between a park position, in which the carrier extends substantially along the vehicle, and a folded-out drive position, in which the carrier extends substantially transverse to the vehicle. Such an actuator is usually referred to by the term power fold actuator. The base of the adjusting instrument then often comprises a foot for mounting on an outer part of the body of the motor vehicle, and a base shaft extending from the foot along an axis of standing orientation with respect to the fixed world, for receiving the carrier, in particular a carrying frame for a mirror glass actuator, in a manner pivotable about the base shaft. Typically, the carrier is connected to the base via a separate drive with its own electric motor, so that the pivoting movement by which the carrier folds in and folds out can be carried out in a driven manner.

In a number of instances, the adjusting instrument may be provided with one actuator having two drives each provided with its own electric motor, with which both the pivoting movement by which the carrier is folded in and out is carried out, and the adjusting movement by which the carrier is adjusted about the standing and/or lying axis is carried out. The exterior vision unit can then be regarded as a two-axis power fold actuator, or as a mirror glass actuator with power fold function. In such an adjusting instrument with single actuator, the pivoting axis can then coincide with the standing adjustment axis. Such an adjusting instrument is described in EP 3218226.

In practice, adjusting instruments often comprise for each axis to be adjusted an electric motor and a driving shaft coupled thereto, which driving shaft cooperates via a transmission along a fixed driving path with one adjusting shaft. The direction of rotation of the adjusting shaft can then be changed only by reversal of the direction of rotation of the electric motor.

This is disadvantageous in that for each axis to be adjusted an electrical circuit needs to be present, with which the direction of rotation of the motor can be reversed. In the case of a direct-current electric motor, for instance in the door of the car, for each axis to be adjusted a switch and wiring need to be present with which the polarity of the motor wiring can be reversed.

Because exterior vision units often need to be adjustable about two adjustment axes, in practice the drive of an adjusting instrument includes more than one electric motor. This is disadvantageous in that electric motors are relatively costly and take up space which is sometimes scarce.

To counteract this disadvantage mentioned, it has already been attempted to provide a drive for an adjusting instrument with which an exterior vision unit is adjustable about two adjustment axes with only one electric motor.

NL1007139, in that regard, describes a drive for an adjusting instrument, in particular for pivoting a carrying element of an exterior mirror for a motor vehicle, whereby the carrying element of an exterior mirror of a vehicle can be pivoted about a standing and a lying adjustment axis respectively, with the aid of a single electric motor. The drive comprises a single electric motor and a driving shaft coupled therewith, which driving shaft cooperates via a transmission with a first and a second adjusting shaft respectively. The first adjusting shaft is driven only upon rotation of a driving shaft in a first direction of rotation, and the second adjusting shaft is driven only upon rotation of the driving shaft in an opposite, second direction of rotation. The two adjusting shafts are each coupled with the carrying element via a rotation-translation converter. The rotation-translation converters each comprise a rotary disc with an eccentrically positioned pin which are received in two mutually transversely oriented, straight slots of the carrying element. During drive, the pin moves cyclically up and down in the slot, so that the carrying element of the exterior mirror can be pivoted about the standing and lying adjustment axis respectively. While this device definitely provides advantages, it also has disadvantages. For instance, when a desired angular position has been passed, it is necessary, because of the cyclic character of the adjustment, first to continue adjustment to an extreme position before the desired angular position can be sought out again. In addition, the adjusting speed is not constant, and runs up from low to high between the extreme position and the neutral position. Because the setting positions are typically located near the neutral position, it may happen that a desired setting position is missed due to the high speed, and that thereupon it takes a long wait before the desired position can be approached again, while the speed is then, once again, high.

Also, there is known from WO2003/086816 a drive for an adjusting instrument, in particular for pivoting a carrying element of an exterior mirror for a motor vehicle, whereby the carrying element of an exterior mirror of a vehicle with the aid of a single direct-current electric motor can be pivoted in two adjustment directions about a standing and a lying adjustment axis, respectively. The drive comprises a single electric motor with a driving shaft which is coupled via a centrifugal clutch with two driving paths each leading to a different adjusting shaft. Upon energization of the motor, the motor in each of the directions of rotation in each case initially adjusts via the first driving path the first adjusting shaft, and when the motor during the energization exceeds a particular speed (rpm), then adjusts via the second driving path the second adjusting shaft. While this device definitely provides advantages, it also has disadvantages. For instance, the motor must first rev up before the direction of rotation can be changed for reaching the second driving path, which can lead to unwanted adjustment via the first driving path. Also, the noise produced by the drive upon adjustment in different directions of rotation differs strongly due to the difference in rotational speed of the motor. This last may be experienced as annoying by the driver of the vehicle. Finally, the available power for adjusting each of the shafts is different in that the speeds (rpm) differ. This means that either a stronger motor has to be chosen, which has a cost price increasing effect, or the chance exists that the motor has insufficient power in the adjustment direction with the lowest speed under certain circumstances, such as for example extreme cold, as a result of which the adjusting device does not adjust in that adjustment direction.

Also in other applications of adjusting instruments, it is desirable to be able to deploy the drive thereof for multiple functions, without this necessitating a separate electric control or circuit. Thus, it may be desirable, without providing an electric control or circuit, to be able, for instance, to adjust a head rest with one and the same electric drive not only in height but also in angular position, or in the case of a drilling machine, to be able not only to rotate the drilling tool in two directions but also to energize and unload the chuck for the drilling tool.

The invention contemplates a drive component for an adjusting instrument with which, while preserving the advantages mentioned, the disadvantages mentioned can be counteracted. In that regard, the invention contemplates inter alia a drive component with which, with a drive and one motor, in one direction of rotation an adjusting shaft can be adjusted in opposite directions of rotation, in particular with constant adjusting speed and with equal motor speed. Also, the invention contemplates a drive component with which, with a drive with one motor, adjustment about two adjustment axes can be effected, with which the adjustment axis and/or the adjustment direction about the respective adjustment axes can be chosen by the user, while the adjusting speed can be constant, and while the adjusting shafts can be adjusted with equal motor speed, and in particular without a necessity for an electric control or electric circuit.

To this end, the invention provides a drive component, comprising a first rotation part and a second rotation part which are arranged to rotate together around a common central axis, and to rotate around that central axis with respect to each other, further comprising a rotation limiter operative between the two rotation parts, which limits rotation between the rotation parts, wherein the rotation limiter is so arranged that when the first rotation part is driven to rotation, the first rotation part after traversing a free angular stroke carries the second rotation part in a mutual angular position determined by the rotation limiter, i.e. the carry-along angle, along in rotation, wherein the rotation limiter comprises an indexer energized by rotation of the first and/or second rotation part, so that in successive driving cycles on the drive component, wherein in each driving cycle the first rotation part is driven from rest to rotation and after carrying along the second rotation part has come to rest again, the carry-along angle is indexed and the rotation parts in successive driving cycles differ in mutual angular position at carry-along.

By providing a rotation limiter with rotation-energized indexer which causes the first and the second rotation part of the drive component upon successive energizations to have a different mutual angular position at carry-along, the drive component can upon successive energizations assume a different configuration. Thus, with the aid of the drive component, a drive can be mechanically controlled by successive energization of the drive. The rotation limiter may be arranged to limit the rotation between the rotation parts per revolution or part thereof. Thus, a series of angular positions can be successively traversed, as, for example, in a cycle. Preferably, the difference between the first and further angular position is 360/n, where n is a natural number between 1-12, e.g. 360°, 180°, 120°, 90°, 72°, 60°, 45°, 40°, 36° or 30°.

By arranging the first rotation part for, in the first and/or further angular position, carrying the second rotation part along via the rotation limiter upon rotation so that the rotation parts rotate together around the central axis, it can be achieved with the aid of the drive component that a load, via the drive component, is yet driven in a conventional manner.

When the indexer is then provided with a passer which is arranged to have at least one of the rotation parts pass the rotation limiter, so that the rotation parts are indexed with respect to each other, the drive component can be implemented in a relatively simple manner.

When the rotation limiter comprises cooperating blocking elements on the first and the second rotation part respectively, it can be achieved in a relatively simple manner that the rotation parts upon rotation carry each other along to rotate together around the central axis.

By arranging the passer to adjust the cooperating blocking elements of the rotation limiter radially and/or axially with respect to each other for passage of the rotation parts, the drive component can be made of compact design, in particular in radial extent.

When the passer comprises a rotation-translation converter, an indexing mechanism can be relatively simply integrated in the drive component, and the drive component can relatively simply change configuration upon successive energizations. In particular, with the aid of such a drive component, a drive can relatively simply switch mechanically between configurations by successive energization cycles of the drive.

When the passer comprises a slide extending transverse to the central axis, it can be achieved that the blocking elements can be selectively moved into and/or out of engagement with each other.

By providing the passer with a rotation energization which energizes the passer upon rotation of one of the rotation parts, it can be achieved that with the aid of a conventional drive the passer, and hence the indexation of the rotation parts with respect to each other, can, by rotation, mechanically assume a different configuration. In particular preferably upon rotation of the first rotation part so that the second rotation part can be indexed with respect to the first rotation part.

When the rotation energization comprises a centrifugal energization, the rotation parts, with the aid of the so-called centripetal acceleration or centrifugal force, can relatively simply assume a different configuration upon successive energizations. In particular so, when the passer is implemented eccentrically and is for instance disposed on the first rotation part, so that upon rotation of the first rotation part the slide of the passer is energized and seeks to change its position due to the centrifugal force. In this way, for example, a cam of the cam and groove pair can be pressed on a surface of the second rotation part until this cam is aligned with a receiving groove and then engages in the receiving groove so that the rotation parts are indexed with respect to each other. Additionally or alternatively, the drive component can comprise one or more eccentric weights which are adjustable between a radially more inwardly located inner position and a radially more outwardly located outer position, and the one or more eccentric weights can energize the passer via corresponding stop surfaces upon rotation, in particular by centrifugal energization.

When the passer is under spring action, in particular against the rotation, more particularly against centrifugal energization, it can be achieved in a relatively simple manner that the passer upon decrease of rotation of the drive component can assume an initial configuration.

By arranging at least one of the rotation parts to give an operating pulse during the limited rotation between successive angular positions of the rotation parts, the rotation parts can be indexed with respect to each other at successive angular positions in a relatively simple manner.

When the rotation parts cooperate via a rotation-translation converter, and the limited rotation between successive angular positions brings about an axial shift of the rotation parts with respect to each other, it can be achieved through a relatively simple construction that the rotation parts are mechanically indexed with respect to each other.

By forming the second rotation part as an output shaft or coupling it with an output shaft, and arranging at least one of the rotation parts for, during the limited rotation between successive angular positions of the rotation parts, giving an operating pulse by axial translation, a drive can, with the aid of the drive component, be mechanically controlled by successive energization of the drive.

The invention also relates to a drive, comprising an electric motor, in particular a DC electric motor, and a drive component as described above, wherein an output shaft of the electric motor is coupled with the first rotation part, and wherein the first and/or second rotation part of the drive component cooperates with a further component of a drive. Thus, elegantly, provision can be made for a drive which can be mechanically controlled by successive energization of the electric motor.

The further component of the drive then preferably is or comprises a transmission, and wherein the output shaft cooperates with the transmission, and wherein the output shaft in first angular position has a first axial position in which it drives a first transmission path of the transmission, and in the further angular position has a second axial position in which it drives a second transmission path of the transmission.

The invention also relates to a method for driving an adjusting instrument, in particular comprising a drive as described hereinabove, wherein by energization of an electric motor a first rotation part and a second rotation part of a drive component are indexed with respect to each other in mutual angular position by a rotation between the first and second rotation part limited at successive angular positions. It is noted that the technical features of the drive as described in the paragraphs hereinabove can also each in themselves be advantageously applied in a drive with a different configuration, i.e., the individual technical features may, if desired, be isolated from their context and be used alone, and if desired be combined with one or several of the above-mentioned features. The invention will be further elucidated on the basis of exemplary embodiments which are represented in drawings. In the drawings:

Figure 5:
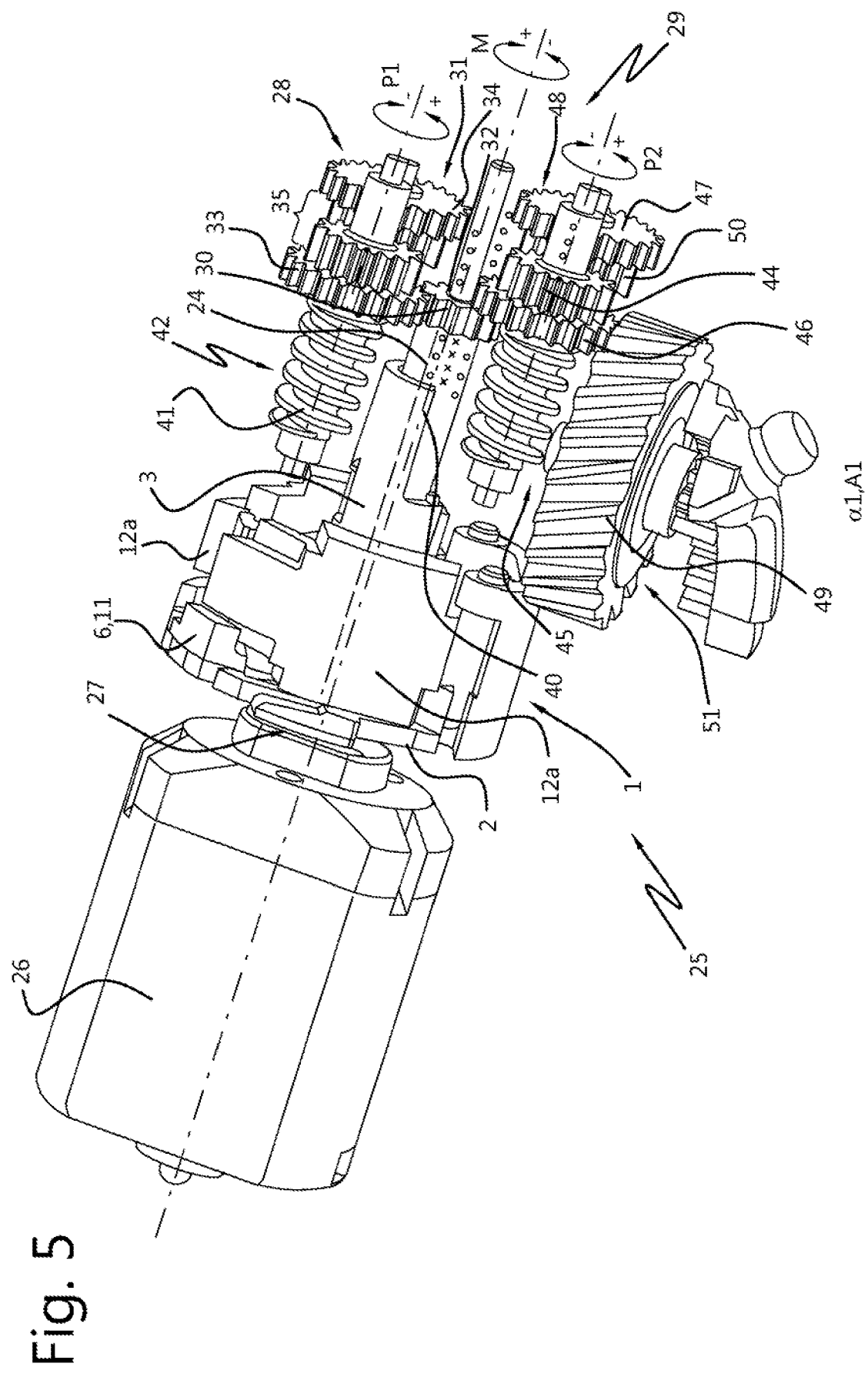

FIGS. 4.1A-4.11C show stepwise rotation of the drive component from three different viewpoints;

FIG. 5 shows a perspective side view of a drive according to a further aspect of the invention.

It is noted that the figures are only schematic representations of preferred embodiments of the invention, and that these are given by way of non-limiting exemplary embodiments. In the exemplary embodiments, like or corresponding parts in the different embodiments are represented with the same reference numerals.

Figure 1:
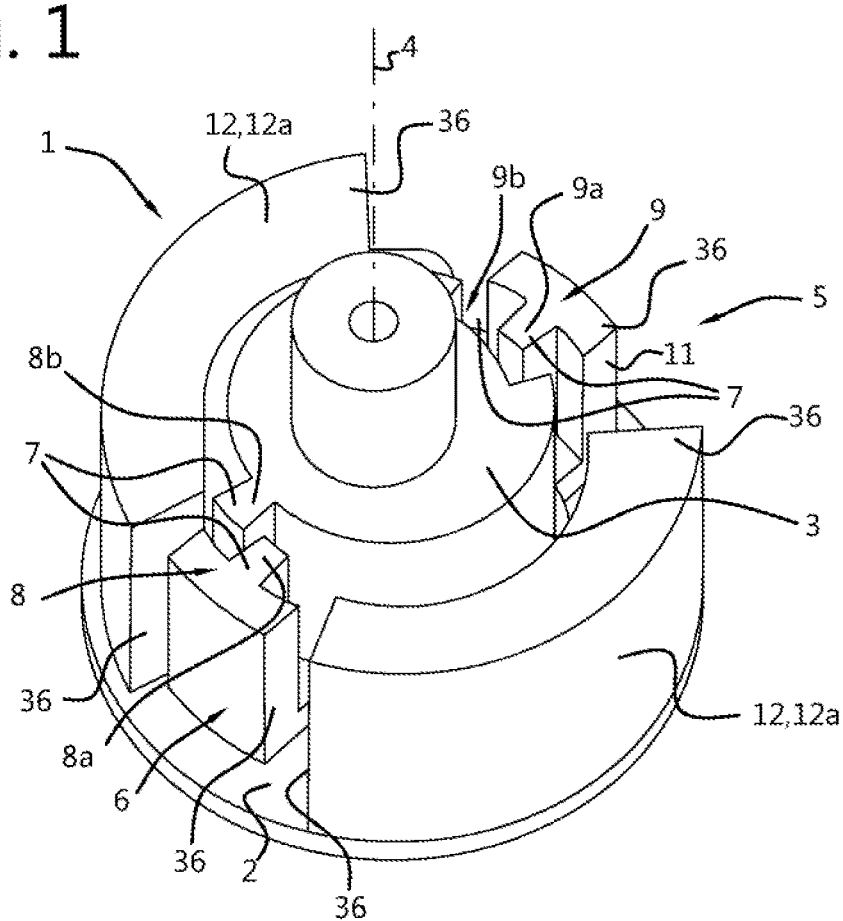
FIG. 1 shows a perspective view of a first embodiment of a drive component according to the invention.

FIG. 1 shows a first embodiment of a drive component 1 according to the invention. The drive component 1 comprises a first rotation part 2 and a second rotation part 3. The two rotation parts 2, 3 are arranged to rotate together around a common central axis 4, and to rotate around that central axis 4 with respect to each other. The drive component 1 further comprises a rotation limiter 5 operative between the two rotation parts 2, 3. The rotation limiter 5 is so designed that when the first rotation part 2 is driven to rotation, the first rotation part 2 after traversing a free angular stroke carries the second rotation part 3 in a mutual angular position defined by the rotation limiter 5, along in rotation. The rotation limiter 5 in this first embodiment is arranged to limit rotation between the rotation parts 2, 3 to a first mutual angular position $\alpha 1$ between the rotation parts 2, 3.

The rotation limiter 5 comprises an indexer 36 energized by rotation of the first rotation part 2. The indexer 36 ensures that in successive driving cycles on the drive component 1, the carry-along angle is indexed and the rotation parts 2, 3 in successive driving cycles differ in mutual angular position at carry-along. In each driving cycle, the first rotation part 2 is driven from rest to rotation and after carrying along the second rotation part 3 it comes to rest again upon termination of the driving cycle.

The indexer 36 is provided with a passer 6. The passer 6 is arranged to have the rotation part 3 pass the rotation limiter 5 so that the rotation parts 2, 3 are indexed with respect to each other, and can rotate further with respect to each other to a further mutual angular position $\alpha 2$ between the rotation parts 2, 3. The rotation limiter 5 thus limits for instance a series of angular positions $\alpha_n$ which by action of the indexer 36, in this example in particular by the passer 6 thereof, are successively traversed, for instance in a cycle. In the example shown, the difference between the first $\alpha 1$ and further angular position $\alpha 2$ with respect to each other according to the formula 360°/n where n=2 is therefore 180°. The first rotation part 2 is arranged so as, in the first α1 and/or further angular position α2, to carry the second rotation part 3 via the rotation limiter 5 along upon rotation, so that the rotation parts 2, 3 rotate together around the central axis 4.

The passer 6 is arranged so as, each time when again rotation of the first rotation part 2 with respect to the second rotation part 3 takes place and is limited, to let the rotation part 3 pass the rotation limiter 5, so that the rotation parts 2, 3 at carry-along are indexed with respect to each other in angular position. This is represented in the top view of FIGS. 2A and 2B, which will be addressed in more detail further on in the description.

Figure 2A:
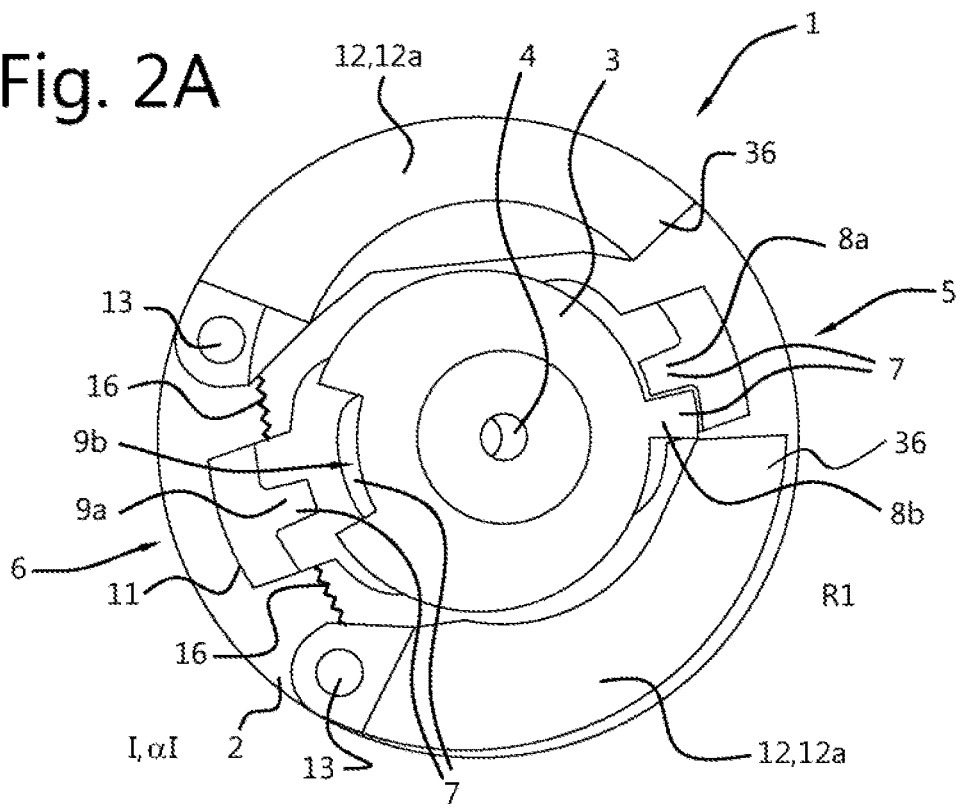
FIG. 2A shows a top view of the drive component of FIG. 1, where rotation between rotation parts is limited in a first angular position.

The rotation limiter 5 comprises cooperating blocking elements 7 on the first 2 and the second rotation part 3, respectively. The cooperating blocking elements 7 shown comprise a cooperating cam pair 8. The cam pair 8 comprises a radially inwardly extending cam 8a on the passer 6 which is carried on the first rotation part 2 and a radially outwardly extending cam 8b on the surface of the second rotation part 3. Additionally or alternatively, the cooperating cam pair 8 may be implemented as a cam pair 8 facing each other axially, which is arranged on the respective parts 2, 3. In FIGS. 1 and 2A, the cams 8a, 8b of the cooperating cam pair 8 are represented as being in engagement with each other. Rotation between the rotation parts 2, 3 is thereby limited to a first angular position α1.

Figure 2B:
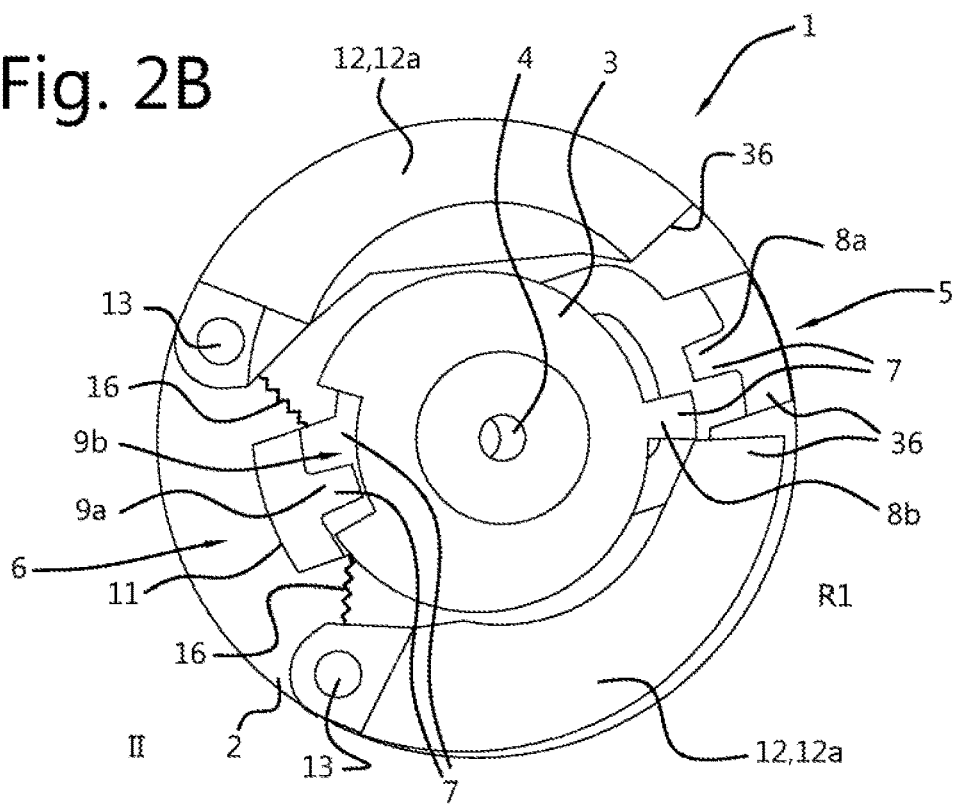
FIG. 2B shows a perspective top view of the drive component of FIG. 1, where rotation between rotation parts is limited to a further angular position.

FIG. 2B shows a state in which the passer 6 of the indexer 36 allows the rotation part 3 to pass the rotation limiter 5. It is shown that the cams 8a, 8b of the cooperating cam pair 8 are disengaged from each other and can therefore pass each other.

The cooperating blocking elements 7 in this example further comprise a cooperating cam and groove pair 9. It is shown that the cooperating cam and groove pair 9 comprises a radially inwardly extending cam 9a on the passer 6 on the first rotation part 2, and a receiving groove 9b in the surface of the second rotation part 3. In the example, the cooperating cam and groove pair 9 can make a passing stroke β of about 10°. Therefore, the receiving groove 9b limits the rotation between the rotation parts 2, 3 to a further angular position α2, not shown. In the exemplary embodiment shown, the cooperating cam and groove pair 9 are disposed opposite to the cooperating cam pair 8. Additionally or alternatively, the cooperating cam and groove pair 9 may be disposed at an angle between 90°-180° with respect to the cooperating cam pair 8.

The successive FIGS. 2A and 2B show that the passer 6 of the indexer 36 is arranged, for the purpose of mutual passage of the rotation parts 2, 3, to adjust the cooperating blocking elements 7 of the rotation limiter 5 at least radially with respect to each other. Additionally or alternatively, the passer 6 may be arranged, for the purpose of mutual passage of the rotation parts 2, 3, to adjust the cooperating blocking elements 7 of the rotation limiter 5 axially with respect to each other.

Figure 3:
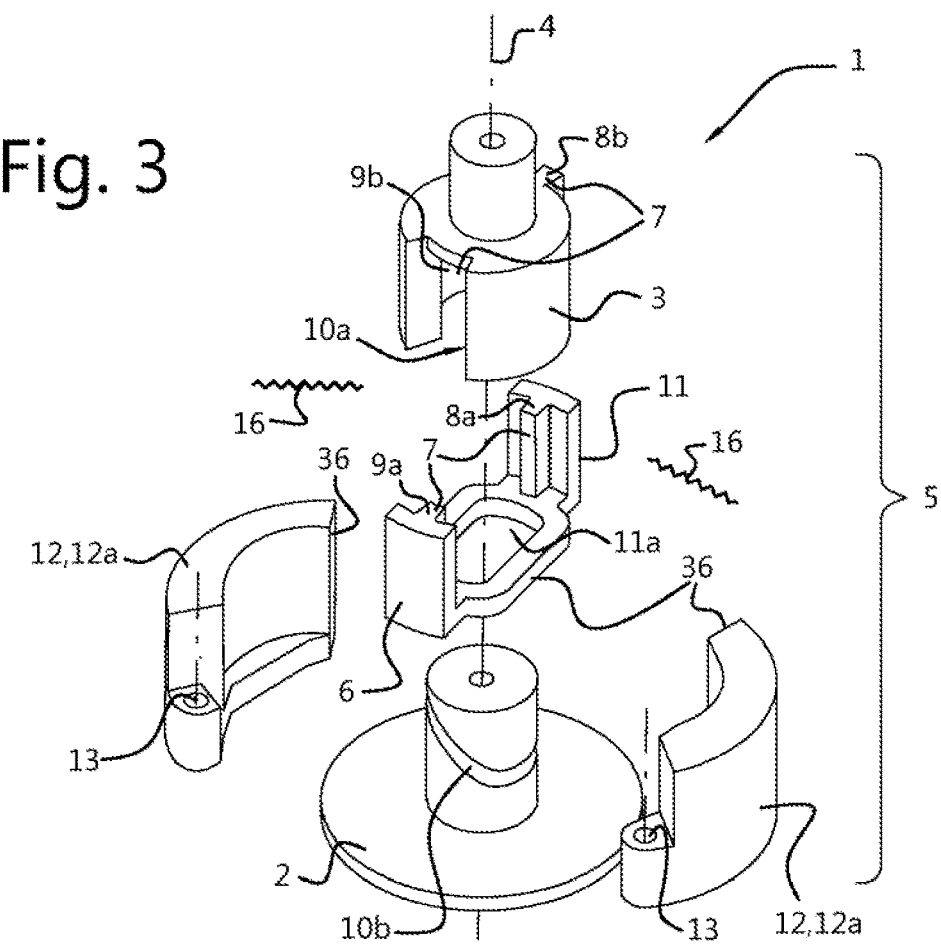
FIG. 3 shows a perspective exploded view of the drive component of FIG. 1.

FIG. 3 shows the drive component 1 of the first embodiment in an exploded view. In FIG. 3 it can be properly seen that the passer 6 comprises a slide 11 extending transverse to the central axis 4. The passer 6 is provided with radially inwardly extending cams 8a, 9a which are disposed opposite to each other on the slide 11. The cams 8a, 9a, as explained above, are part of the cooperating blocking elements 7. Between the radially inwardly extending cams 8a, 9a extends an elongate slot 11a. The slot 11a is arranged to cooperate with the first rotation part 2, such that the passer 6 is adjustable between a first position I in which the cooperating cam pair 8a, 8b are in engagement with each other (FIG. 2A), and a second position II in which the cooperating cam pair 8a, 8b can pass each other, and in which the cooperating cam and groove pair 9a, 9b interlock in order to enable a free rotation stroke of the first rotation part 2 with respect to the second rotation part 3. The cooperating cam pair 8a, 8b can then pass each other (FIG. 2B). At the end of the free rotation stroke, the radially inwardly extending cam 9a cooperates with an edge of the groove 9b, such that the rotation parts 2, 3 are in a further mutual angular position α2, indexed by the passer 6 of the indexer 36, in which the rotation limiter 5 limits the rotation between the rotation parts 2, 3 again and the rotation parts 2, 3 can carry each other along again.

In FIGS. 1-3 it is shown that the rotation limiter 5 comprises an indexer 36 energized by rotation of the first rotation part 2. This concerns in particular a rotation energization 12 of the passer. This energization is implemented as a centrifugal energization, which energizes the passer 6 upon rotation of the first rotation part 2. The centrifugal energization 12 comprises two pivotably disposed eccentric weights 12a on the first rotation part 2. The pivotably disposed eccentric weights 12a are each pivotable about an own pivoting axis 13, which axes 13 are located eccentrically with respect to the central axis 4. In the example shown, the pivoting axes 13 extend substantially along the central axis 4, but of course the pivoting axes 13 may also extend at an angle to the central axis 4. The pivotably disposed eccentric weights 12a are adjustable between a radially more inwardly located, inner position R1 and radially more outwardly located, outer position R2.

The pivotably disposed eccentric weights 12a are each provided, adjacent the pivoting axes 13, with a push surface not shown which is arranged to cooperate with a receiving surface provided on the passer 6, so that the passer is adjustable transverse to the central axis between the first position I and second position II. In the radially outer position R2, the eccentric weights 12a are located within the external contour of the first rotation part. In this manner, the construction can be of relatively compact design.

The passer 6 is under spring action of a pushback spring 16, in particular against the rotation energization 12. As a result, upon decrease and/or termination of the rotation, the passer 6 adjusts from the second position II (back) to the first position I and the cooperating cam pair 8 are in each other's path again.

To the person skilled in the art it will be clear that it is also possible to give the passer 6 itself an eccentric design and/or to provide it with pivotably disposed eccentric weights 12a, so that the passer 6 is adjustable transverse to central axis 4 between the first I and second position II. The passer 6 and/or pivoting axes 13 may then be so designed that when rotation of at least the first rotation part 2 has stopped, the passer 6 (re)adjusts under the action of gravity from the second II to the first position I.

In FIG. 2A the passer 6 is in the first position I. Upon rotation of the first rotation part 2 the pivotably disposed eccentric weights 12a adjust from the radially inner position R1 to the radially outer position R2, as a result of which, via the cooperation of the push surfaces 14 with the receiving surfaces 15, the passer 6 adjusts from the first position I to the second position II. In FIG. 2B the passer is in the second position II, in which the radially inwardly extending cam 9a is aligned with the receiving groove 9b and has been pressed into it, and the cooperating cam pair 8 can pass each other.

Thus, in successive driving cycles on the drive component 1, where in each driving cycle the first rotation part 2 is driven from rest to rotation and after carrying the second rotation part 3 along has come to rest again, the carry-along angle is indexed and the rotation parts 2, 3 in successive driving cycles differ in mutual angular position at carry-along. These differences in mutual angular position can be used to vary the configuration of a drive 25 which the drive component 1 is part of, and thereby control the drive 25. In this embodiment, the second rotation part 3 is for instance arranged to give an operating pulse during the limited rotation between successive mutual angular positions α of the rotation parts 2, 3. To this end, the drive component 1 is provided with a rotation-translation converter 10. The rotation-translator converter 10 comprises a finger 10*a* on the second rotation part 3, the finger 10*a* being arranged to cooperate slidingly in axial longitudinal guiding with a receiving surface 10*b*, in particular a helical groove, on the first rotation part 2. With such an operating pulse, for example, a central shaft of an adjustable gear transmission 29 coupled with the drive component 1 can be adjusted.

FIGS. 4.1A-4.11C show a second embodiment of the drive component 1. On the basis of FIGS. 4.1A-4.11C, the rotation energization 12, in particular the centrifugal energization, is visualized in successive steps and further explained below. The second embodiment comprises the same elements as the first embodiment described above. With respect to the first embodiment, the rotation limiter 5 comprises further cooperating blocking elements 7 on the first 2 and second rotation part 3, respectively, wherein the second rotation part 3 is provided with a second radially outwardly extending cam 18 which is disposed opposite to and along the central axis 4 remote from the radially outwardly extending cam 8*b*, and a second receiving groove 19 which is disposed opposite to and along the central axis 4 remote from the receiving groove 9*b*, and wherein the first rotation part 2 is provided with a further receiving groove 20 near the inwardly extending cam 9*a*. The radially inwardly extending cam 9*a* is arranged to cooperate in the second position II of the passer 6 with receiving groove 9*b*. The radially inwardly extending cam 9*a* is further arranged to cooperate in the second position II of the passer 6 with the second receiving groove 19 while the radially outwardly extending cam 8*b* cooperates with the further receiving groove 20. Thus, in successive driving cycles on the drive component 1, where in each driving cycle the first rotation part 2 is driven from rest to rotation and after carrying the second rotation part 3 along has come to rest again, the carry-along angle is indexed and the rotation parts 2, 3 in successive driving cycles differ in mutual angular position at carry-along. The additional cams and grooves augment the operational reliability of the drive component 1.

FIGS. 4.1A-4.11C show stepwise rotation of the drive component 1, whereby the first rotation part 2 is driven. In FIGS. 4.1A-4.6C in each case the second rotation part 3 rotates to illustrate the working of the second embodiment.

In a first position B of FIGS. 4.1A-4.1C the slide 11, in particular the passer 6, is in the first position I. The eccentric weights 12*a* are in the radially inner position R1. The second rotation part 3 is in a first axial position A1.

In FIGS. 4.2A-4.2C, by clockwise rotation of the first rotation part 2, the angular position α between the first 2 and second rotation part 3 has changed.

In FIGS. 4.3A-4.3C the angular position α has increased until the cooperating cam pair 8 cooperates, such that the rotation limiter 5 limits rotation between the rotation parts 2, 3 to the angular position α1. In FIG. 4.3C it is represented that the second rotation part 3 has been displaced via the rotation-translation converter 10 with respect to the first rotation part 2 axially along the central axis 4 to a second axial position A2.

In FIGS. 4.4A-4.4C the eccentric weights 12*a* have been adjusted by rotation energization 12, in particular centrifugal energization, to the radially outer position R2. Via the cooperation between the push surfaces 14 and the receiving surfaces 15, the passer 6, also by rotation energization 12, in particular centrifugal energization, has been adjusted from the first position I to the second position II.

In FIGS. 4.5A-4.5C the second rotation part 3 has been rotated with a passing stroke β with respect to the first rotation part 2, and radially outwardly extending cam 8*b* has passed the radially inwardly extending cam 8*a* while radially inwardly extending cam 9*a* cooperates with receiving groove 9*b*. As long as the second rotation part 3 rotates, radially inwardly extending cam 9*a* and receiving groove 9*b* continue, due to the centrifugal energization, to cooperate, as a result of which the second rotation part 3 rotates along with the first rotation part 2 via the rotation limiter 5 in the second axial position A2.

In FIGS. 4.6A-4.6C the rotation has stopped and the drive component 1 is in a second position E [ε] in which the second rotation part 3 is in a second axial position A2 (FIG. 4.6C), the eccentric weights 12*a* are in the radially inner position R1 again (FIG. 4.6A), and the passer 6 is in the first position I again (FIG. 4.6A).

When the first rotation part 2 is rotation energized again from the second position E, in a reverse manner the second rotation part 3 will move via the rotation-translation converter 10 axially along the central axis 4 to the first axial position A1. Upon termination of the rotation, the drive component 1 will be in the first position B again. This is shown in FIGS. 4.7A-4.11C. In FIGS. 4.7A-4.11C in each case both the first 2 and the second rotation part 3 rotate.

In FIGS. 4.7A-4.7C, by clockwise rotation of the first rotation part 2, the angular position α between the first 2 and second rotation part 3 has changed.

In FIGS. 4.8A-4.8C the angular position α has increased until the inwardly extending cam 8*a* cooperates with the outwardly extending cam 18, such that the rotation limiter 5 limits rotation between the rotation parts 2, 3 to the angular position α2. In FIG. 4.8C it is represented that the second rotation part 3 has been displaced via the rotation-translation converter 10 with respect to the first rotation part 2 axially along the central axis 4 to the first axial position A1.

In FIGS. 4.9A-4.9C the eccentric weights 12*a* have been adjusted by rotation energization 12, in particular centrifugal energization, to the radially outer position R2. Via the cooperation between the push surfaces 14 and the receiving surfaces 15, the passer 6, also by rotation energization 12, in particular centrifugal energization, has been adjusted from the first position I to the second position.

In FIGS. 4.10A-4.10C the second rotation part 3 has been rotated with a passing stroke β with respect to the first rotation part 2, and the radially outwardly extending cam 18 has passed the radially inwardly extending cam 8*a* while radially inwardly extending cam 9*a* cooperates with second receiving groove 19 and the radially outwardly extending cam 8*b* cooperates with the further receiving groove 20. As long as the second rotation part 3 rotates, the radially inwardly extending cam 9*a* and receiving groove 19, and the radially outwardly extending cam 8*b* and the receiving groove 20, respectively, continue to cooperate due to the centrifugal energization. As a result, the second rotation part 3 rotates along with the first rotation part 2 via the rotation limiter 5 in the first axial position A1.

In FIGS. 4.11A-4.11C the rotation has stopped and the drive component 1 is in the first position B again.

The rotation parts 2, 3 cooperate via the rotation-translation converter 10. The limited rotation between successive angular positions α brings about a radial and/or axial shift of the rotation parts 2, 3 with respect to each other. To this end, the drive component 1 of both above-described embodiments is provided with the finger 10a, not visible, cooperating with the endless helical groove 10b, so that the rotation parts 2, 3 can move axially up and down with respect to each other along the central axis 4. The second rotation part 3 forms an output shaft 24. Additionally or alternatively, the second rotation part 3 may be coupled with an output shaft 24, as is for instance shown in FIG. 5 and will be further elucidated below. The second rotation part 3 is arranged for, during the limited rotation between successive angular positions α of the rotation parts 2, 3, giving an operating pulse by means of axial translation.

FIG. 5 shows a further elaborated example of a drive 25 according to the invention. The drive 25 comprises an electric motor 26, in particular a DC electric motor. Further, the drive 25 comprises a drive component 1. The drive component comprises a first rotation part 2 and a second rotation part 3. The rotation parts in this example are arranged to rotate together around a common central axis, and to rotate around that axis with respect to each other. The second rotation part 3 is axially adjustable with respect to the first rotation part 1 between a first position and a second position. The drive component 1 is implemented in this example as the above-described second embodiment of the implementation example. The second rotation part 3, however, may also be axially adjustable with respect to the first rotation part 2 between a first position and a second axial position in a different manner than by relative rotation with the above-described rotation-energized indexer, for example by means of axial displacement with the aid of electromagnetic operation.

An output shaft 27 of the electric motor 26 is fixedly coupled with the first rotation part 2. The second rotation part 3 is axially adjustable with respect to the first rotation part 2. The second rotation part 3 of the drive component 1 further cooperates via a rotation-translation converter 40 in an axially telescoping manner with an output shaft 24 of the drive component 1. The second rotation part 3 and the output shaft 24 together form an axially telescoping driving shaft. The cylindrical output shaft 24 of the drive component 1, in this example, is received with a sliding fit in a hollow cylindrical shaft portion of the second rotation part 3, and one of the two members is provided with one or more pins which are received in one or more corresponding helical grooves in the other member. Alternatively, for instance, a screw thread operative between the two members may be opted for. The output shaft 24 of the drive component in turn cooperates with a further component 28 of the drive 25, in particular via a gear 32 carried on the output shaft 24. By use of the rotation-translation converter 40, the gear 32 is axially adjustable between a slid-in drive shaft position corresponding to a first direction of rotation M+ of the motor 26 (shown in FIG. 5, and resulting from driving to the right), and a slid-out drive shaft position corresponding to the opposite direction of rotation M− of the motor 26 (not represented in FIG. 5, and resulting from driving to the left).

The further component 28 of the drive 25 is a transmission 29 in this exemplary embodiment. The output shaft 24 cooperates with the transmission 29. The output shaft 24, upon driving of the motor 26 in the first direction M+, in this example to the right, selectively cooperates with, respectively, either an input gear 33 of a first driving path 30 represented with dashes or an input gear 34 of a second driving path 31 represented with full dots, of a first output branch 42 of the transmission 29. The output shaft 24, upon successive energization of the motor 26 in the same direction, so to the right here, is then switchable, through axial adjustment of the second rotation part 3 with respect to the first rotation part 2, between the first driving path 30 and the second driving path 31 of the first output branch 42 of the transmission 29. The output shaft 24 has, in the first angular position α1 of the second rotation part 3 with respect to the first rotation part 2, a first axial position A1 in which the output shaft 24 drives the first driving path 30 of the transmission 29. In the further angular position α2, the output shaft 24 has the second axial position A2 in which it drives the second driving path 31 of the transmission 29 (not shown). In these two axial positions A1 and A2, the axially telescoping rotation-translation converter 40 is always in the slid-in drive shaft position. The output shaft 24 comprises a gear 32 which in the first driving path 30 cooperates with an input gear 33 which is included in the first output branch 42 of the transmission 29 to rotate a first output element 41 of the transmission 29, here a first worm gear, in a first direction of rotation P1+. In the second driving path 31, the gear 32 cooperates with input gear 34 which is included in the transmission 29 to rotate the first output element 41 of the transmission 29 via intermediate gear pair 35 in an opposite direction of rotation P1−. What can be achieved in this manner is that the output shaft 24 of the transmission 29, in successive driving cycles in the same driving direction can drive a first output element 41 of the transmission 29 in two opposite directions of rotation P1+ and P1−. It is noted that upon adjustment between the two axial shaft positions A1 and A2, the gear 32 moves along a further input gear 46, though without remaining in engagement therewith to drive the gear 46. This input gear is of a third driving path 44, discussed below, located in a second output branch 45 of the transmission. When the motor 26 is driven in the opposite direction M−, in this case to the left, the drive shaft will proceed, with the aid of the axially telescoping rotation-translation converter 40, to the slid-out drive shaft position. The output shaft 24 cooperates, upon driving of the motor 26 in this second, opposite direction, selectively with, respectively, input gear 46 of a third driving path 44, represented with crosses, and an input gear 47 of a fourth driving path 48 represented with open dots. The third driving path 44 and the fourth driving path 48 are located in the second output branch 45 of the transmission 29. The output shaft 24, upon successive energizations of the motor 26 in the same direction M−, so in each case to the left here, is switchable between the third driving path 44 and the fourth driving path 48. The output shaft 24 has, in the first angular position α1 of the second rotation part 3 with respect to the first rotation part 2, a first axial position B1 in which the output shaft 24 drives the third driving path 44 of the transmission 29 (not represented). In the further angular position α2 the output shaft 24 has the second axial position B2 in which it drives the fourth driving path 48 of the transmission 29 (not represented). In these two axial positions B1 and B2, the drive shaft with the axially telescoping rotation-translation converter 40 is always in the slid-out drive shaft position. The gear 32 of the output shaft 24 cooperates in the third driving path 44 with the input gear 46 to rotate a second output element 49 of the transmission 29, here a second worm gear, positively in a second direction of rotation P2+.

In the fourth driving path 48 the gear 32 cooperates with an input gear 47 which is included in the second output branch 45 of the transmission 29 to rotate the second output element 49 of the transmission 29 via intermediate gear pair 50 negatively in the second direction of rotation P2−. It is noted that upon adjustment between the two axial shaft positions B1 and B2, the gear 32 moves along input gear 34 of the second driving path 31 of first output branch 42, though without remaining in engagement therewith to drive the gear 34.

What can be achieved in this manner is that the shaft 24 of the transmission 29, upon successive driving in the same opposite driving direction M− of the motor 26, to the left here, can drive a second output element 49 of the transmission 29 via a second branch 45 of the transmission in two opposite directions of rotation P2+ and P2−. With each of the output elements 41, 49 implemented as worm gear, for example a final stage of an actuator can be driven, for example a final stage 51, represented for the second output branch 45, for pivoting an exterior vision unit for a motor vehicle, such as a camera or exterior mirror, about an adjustment axis. Thus, with just one electric motor, by change of rotary direction M−/M− of the motor 26, an exterior vision unit can be pivoted about two adjustment axes, for example x and y, and, by successive energization of the motor in the same direction M+ and M+ or M− and M−, be pivoted alternately in positive or negative direction about that adjustment axis x or y.

It is noted that such a telescoping rotation-translation converter can also in itself be seen as an invention, and can be configured in many embodiments. In that regard, in the light of the above-described example, for instance the following embodiments can be distinguished:

EMBODIMENTS

1. Drive, comprising an electric motor, in particular a DC electric motor, and a drive component with a first rotation part and a second rotation part which is axially adjustable with respect to the first rotation part between a first position and a second position, wherein an output shaft of the electric motor is fixedly coupled with the first rotation part of the drive component, and wherein the second rotation part of the drive component is coupled via a rotation-translation converter in axially telescoping manner with an output shaft of the drive component, so that the second rotation part and the output shaft of the drive component together form an axially adjustable and axially telescoping drive shaft.

2. Drive according to embodiment 1, wherein the drive shaft is adjustable between a slid-in drive shaft position corresponding to first direction of rotation M+ of the motor, and a slid-out drive shaft position corresponding to the opposite direction of rotation M− of the motor.

3. Drive according to embodiment 1 or 2, wherein the output shaft of the drive component cooperates with a transmission.

4. Drive according to any one of the preceding embodiments, wherein the output shaft in the slid-in drive shaft position cooperates with a first output branch of the transmission, and in the slid-out drive shaft position cooperates with a second output branch of the transmission.

5. Drive according to embodiment 4 as far as dependent on embodiment 2, wherein the first output branch comprises a first and a second driving path with which in the slid-in drive shaft position in the first and, respectively, second axial position of the second rotation part a first output element can be driven in opposite directions of rotation P1+, P1−, and wherein the second output branch comprises a third and a fourth driving path with which in the slid-out drive shaft position in the first and, respectively, second axial position of the second rotation part a second output element can be driven in opposite directions of rotation P2+, P2−.

6. Drive according to any one of the preceding embodiments, wherein the output shaft of the drive component carries a gear.

7. Drive according to embodiment 6 as far as dependent on embodiment 5, wherein the gear in the first driving path cooperates with an input gear that is included in the first output branch of the transmission to rotate a first output element of the transmission in a first direction of rotation P1+, and wherein the gear in the second transmission path cooperates with an input gear that is included in the transmission to rotate the first output element of the transmission in an opposite direction of rotation P1−, and wherein the gear in the third driving path cooperates with an input gear that is included in the second output branch of the transmission to rotate a second output element of the transmission positively in a second direction of rotation P2+, and in the fourth driving path cooperates with an input gear to rotate the second output element negatively in the second direction of rotation P2−.

It is noted that the invention is not limited to the exemplary embodiments described here. Many variants are possible.

Thus, the invention may for instance be used in an adjustable head rest, a trunk lid, a fuel tank/charging socket flap unit, a sunroof, headlight adjustment, and/or a side door of a vehicle. In addition, the invention is for instance eminently suitable to be used in inter alia window furnishings, a (security) camera or a drilling machine.

Thus, an adjusting module for operating a flap can comprise a drive component which is provided with features such as described above, whereby an output adjusting element of the adjusting module is coupled with the first rotation part of the drive component for adjustment of the flap between at least an open position and a covering position, and wherein the first and/or the second rotation part of the drive component cooperates via a transmission with a lock of the flap for adjusting the lock between at least a locked position and an unlocked position.

By coupling an adjusting element of the adjusting module with the first rotation part of the drive component, whereby the first and/or the second rotation part of the drive component cooperate(s) via a transmission with a lock of the flap, both the opening and closing of the flap and the lock of the flap can be relatively simply operated. Thus, for instance, via a drive, comprising an electric motor, in particular a DC electric motor, a tailboard or loading flap of a vehicle can be pivoted with the adjusting module about a pivoting axis and/or be translated along a guide, in particular a guide rail provision. In addition, the same drive can lock and/or unlock the lock of the loading flap. Additionally or alternatively, for instance via such drive, a flap part of a fuel tank/charging-socket flap unit of a vehicle can be adjusted with the adjusting module between the open and/or covering, shut position, and lock a lock, in particular one implemented as a pin, of the fuel tank/charging-socket flap unit, or a charging cable, in particular a plug of the charging cable, when the charging cable during recharging is connected to the vehicle. In this manner, decoupling of the charging cable during recharging can be counteracted.

Advantageously, a drive may be provided with a drive component with features as described above, whereby upon a first energization an output shaft of the drive is coupled with the first rotation part of the drive component so that the first rotation part via a transmission traverses a first adjustment stage whereby adjustment can be done with a relatively high speed and relatively low couple, and whereby upon a second successive energization the output shaft of the drive is coupled with the first and/or the second rotation part of the drive component so that the first and/or the second rotation part traverses a second adjustment stage via a further transmission whereby adjustment can be done with a low speed and relatively high couple. In this manner, for example, closing and thereupon locking a trunk lid, a fuel tank/charging-socket flap unit, sunroof and/or side door of a motor vehicle can be facilitated.

Such an adjusting module provided with a drive component with features as described above, optionally provided with a drive, may for instance also be used for adjusting and/or locking e.g. side doors, hood and/or sunroof of a vehicle.

Further, there are numerous couple-producing power sources that can generate a couple only in one direction by the nature of their functioning, such as, for example, watermills, wind turbines, particular types of AC motors and piezo motors. An application could be to provide such power sources with a drive component with features such as described above so that upon successive energization, for example, a direction of rotation of an output shaft is changed via a transmission. Further, such a drive component may be applied in a cost-saving manner in e.g. sustainable energy sources such as solar cell fields, or in agriculture for irrigation, in particular by virtue of a simplified construction for which fewer drives are needed for adjustment between two, three, four or more positions and/or a plurality of components.

Such an adjusting module provided with a drive component with features as described hereinabove, optionally provided with a drive, may also be used, for instance, for adjusting and/or locking side doors, hood and/or sunroof of a vehicle.

Thus, furthermore, an adjusting module for a window furnishing having at least one slat, in particular blinds, such as Luxaflex® or Venetian blinds, can comprise a drive component which is provided with features as described hereinabove, whereby an output shaft of the adjusting module is coupled with the first rotation part for rotating adjustment of the at least one slat about its longitudinal axis, and whereby the first and/or the second rotation part of the drive component cooperates with an output element of the adjusting module for translating adjustment of the at least one slat substantially transverse to its longitudinal axis along a guide of the adjusting module.

By coupling an output shaft of the adjusting module with the first rotation part of the drive component for adjustment of the at least one slat about its longitudinal axis, the at least one slat can be adjusted between at least a blinding condition and a release condition, such that e.g. the amount of transmitted light can be controlled. When the first and/or the second rotation part of the drive component cooperate(s) with an output element of the adjusting module for adjustment of the at least one slat substantially transverse to its longitudinal axis along a guide of the adjusting module, it can be achieved that the at least one slat is adjusted e.g. in height, in particular for a slat or slats disposed horizontally in the guide, and/or in transverse direction, in particular for a slat or slats disposed vertically in the guide. The guide may for instance be implemented as a guide rail or as cords. The adjusting module may for instance be operated manually and/or with an electric drive.

Such an adjusting module provided with a drive component with features as described hereinabove may for instance also be used in (security) cameras for pivoting the security camera via a transmission of the adjusting module, about at least a lying axis and/or a standing axis, or in a (head) rest for adjusting the (head) rest in angular position and/or height. The adjusting module provided with the drive component may also be used to adjust more positions than two, e.g. three, four or more, such as infinitely many positions.

Such variants will be clear to one skilled in the art and are understood to be within the scope of the invention, as set forth in the appended claims.

LIST OF REFERENCE SIGNS

1. Drive component
2. First rotation part
3. Second rotation part
4. Central axis
5. Rotation limiter
6. Passer
7. Cooperating blocking elements
8. Cooperating cam pair
8a. Radially inwardly extending cam
8b. Radially outwardly extending cam
9. Cooperating cam and groove pair
9a. Radially inwardly extending cam
9b. Receiving groove
10. Rotation-translation converter
10a. Finger
10b. Receiving surface/Helical groove
11. Slide
11a. Slot
12. Rotation energization/Centrifugal energization
12a. Pivotably disposed eccentric weights
13. Pivoting axis
14. -
15. -
16. Pushback spring
18. Second radially outwardly extending cam
19. Second receiving groove
20. Further receiving groove
24. Output shaft
25. Drive
26. Electric motor
27. Output shaft of the electric motor
28. Further component
29. Transmission
30. First transmission path
31. Second transmission path
32. Gear
33. Input gear first transmission path
34. Input gear second transmission path
35. Intermediate gear pair
36. Indexer
37. -
38. -
39. -
40. Rotation-translation converter
41. First output element
42. First output branch
43. -
44. Third driving path
45. Second output branch
46. Input gear third transmission path
47. Input gear fourth transmission path
48. Fourth driving path 49. Second output element
50. Intermediate gear pair
51. Final stage
I. First position
II. Second position
R1. Radially inner position
R2. Radially outer position
A1 First axial shaft position in first mutual angular position α1
A2 Second axial shaft position in first mutual angular position α1
B1 First axial shaft position in further mutual angular position α2
B2 Second axial shaft position in further mutual angular position α2
E Second position
M Direction of rotation motor/output shaft
P1 Direction of rotation first output branch
P2 Direction of rotation second output branch
S1. First axial position gear in slid-in position of rotation-translation converter
S2. Second axial position gear in slid-in position of rotation-translation converter
T1. First axial position in slid-out position of rotation-translation converter
T2 Second axial position in slid-out position of rotation-translation converter
α. Angular position
$α_n$. Successive mutual angular positions
α1. First mutual angular position
α2. Further mutual angular position
β. Passing stroke

The invention claimed is:

1. A drive component, comprising:
a first rotation part;
a second rotation part; and
a rotation limiter comprising an indexer, wherein
the first rotation part and the second rotation part are arranged to rotate together around a common central axis and to rotate around the common central axis with respect to each other,
the rotation limiter is operative between the two rotation parts, which limits rotation between the rotation parts,
the rotation limiter is so arranged that when the first rotation part is driven to rotation, the first rotation part after traversing a free angular stroke carries the second rotation part along in rotation at a carry-along angle determined by the rotation limiter, wherein the carry-along angle is a mutual angular position between the first rotation part and the second rotation part when the second rotation part is carried by the first rotation part,
wherein the indexer is energized by rotation of at least one of the first rotation part or the second rotation part, so that in successive driving cycles on the drive component, the carry-along angle is indexed and the rotation parts in successive driving cycles differ in mutual angular position at carry-along relative to one another,
wherein in each driving cycle the first rotation part is driven from rest to rotation and after carrying along the second rotation part has come to rest again.

2. The drive component according to claim 1, wherein the indexer comprises a passer which is arranged to have at least one of the rotation parts pass the rotation limiter.

3. The drive component according to claim 2, wherein the rotation limiter comprises cooperating blocking elements on the first and the second rotation part, respectively.

4. The drive component according to claim 3, wherein the blocking elements comprise a cooperating cam pair.

5. The drive component according to claim 3, wherein the blocking elements comprise a cooperating cam and groove pair.

6. The drive component according to claim 3, wherein the passer is arranged to adjust cooperating blocking elements of the rotation limiter by at least one of radially or axially with respect to each other for passage of the rotation parts.

7. The drive component according to claim 3, wherein the passer comprises a rotation-translation converter.

8. The drive component according to claim 3, wherein the passer comprises a slide extending transverse to the central axis.

9. The drive component according to claim 3, wherein the passer comprises a rotation energization which energizes the passer upon rotation of one of the rotation parts.

10. The drive component according to claim 9, wherein the rotation energization comprises a centrifugal energization.

11. The drive component according to claim 3, wherein the passer is under spring action.

12. The drive component according to claim 1, wherein at least one of the rotation parts is arranged to give an operating pulse during the limited rotation between successive angular positions of the rotation parts.

13. The drive component according to claim 1, wherein the rotation parts cooperate via a rotation-translation converter, and wherein the limited rotation between successive angular positions brings about an axial shift of the rotation parts with respect to each other.

14. The drive component according to claim 1, wherein the second rotation part forms an output shaft, or is coupled with an output shaft, and wherein at least one of the rotation parts is arranged so as, during the limited rotation between successive angular positions of the rotation parts, to give an operating pulse by axial translation.

15. A drive, comprising an electric motor and the drive component according to claim 1, wherein an output shaft of the electric motor is coupled with the first rotation part, and wherein at least one of the first rotation part or the second rotation part of the drive component cooperates with a transmission of the drive.

16. The drive according to claim 15, wherein the second rotation part forms an output shaft, or is coupled with an output shaft; and the at least one of the rotation parts is arranged so as, during the limited rotation between successive angular positions of the rotation parts, to give an operating pulse by axial translation, wherein the output shaft cooperates with the transmission, and wherein the output shaft in first angular position has a first axial position in which it drives a first transmission path of the transmission, and in the further angular position has a second axial position in which it drives a second transmission path of the transmission.

17. A method for driving an adjusting instrument comprising the drive according to claim 16, wherein by energization of the electric motor the first rotation part and the second rotation part of the drive component are indexed with respect to each other in mutual angular position by a rotation between the first and second rotation part, limited at successive angular positions.

18. A method for driving an adjusting instrument comprising the drive according to claim 15, wherein by energization of the electric motor the first rotation part and the second rotation part of the drive component are indexed with respect to each other in mutual angular position by a rotation between the first and second rotation part, limited at successive angular positions.

\* \* \* \* \*